United States Patent
Kim et al.

(10) Patent No.: US 10,089,837 B2
(45) Date of Patent: Oct. 2, 2018

(54) SYSTEM AND METHOD FOR AUDIBLY COMMUNICATING A STATUS OF A CONNECTED DEVICE OR SYSTEM

(71) Applicant: GE AVIATION SYSTEMS, LLC, Grand Rapids, MI (US)

(72) Inventors: So Young Kim, Dublin, CA (US); Richard Alan Phillips, Paris (FR); David Bartlett, Danville, CA (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 0 days.

(21) Appl. No.: 15/151,090

(22) Filed: May 10, 2016

(65) Prior Publication Data

US 2017/0330427 A1    Nov. 16, 2017

(51) Int. Cl.
*G08B 21/00* (2006.01)
*G08B 3/00* (2006.01)
*B60Q 9/00* (2006.01)

(52) U.S. Cl.
CPC ....... *G08B 3/00* (2013.01); *B60Q 9/00* (2013.01)

(58) Field of Classification Search
CPC .... B64D 45/00; G08G 5/0021; G08G 5/0078; G08G 5/04; G08G 1/123; G08G 5/0008; G08G 1/16; G08G 3/02; G08B 21/00; G08B 23/00; G08B 3/00; B60Q 9/00; H04B 3/54
USPC ....... 340/963, 964, 965, 970, 945, 973, 971, 340/961
See application file for complete search history.

(56) References Cited

U.S. PATENT DOCUMENTS

| | | | |
|---|---|---|---|
| 2,382,557 A | 8/1945 | Frazier | |
| 2,445,712 A | 7/1948 | Forbes | |
| 3,068,589 A | 12/1962 | Bonwit | |
| 3,391,340 A | 7/1968 | Flyer et al. | |
| 4,884,067 A * | 11/1989 | Nordholm | G08B 13/02 200/61.52 |
| 5,276,712 A * | 1/1994 | Pearson | H04L 7/033 327/18 |
| 6,052,056 A * | 4/2000 | Burns | G08B 19/02 250/573 |
| 6,097,315 A | 8/2000 | Minter | |
| 6,801,158 B2 | 10/2004 | Snodgrass et al. | |
| 7,123,169 B2 * | 10/2006 | Farmer | G01S 7/003 340/945 |

(Continued)

FOREIGN PATENT DOCUMENTS

| | | |
|---|---|---|
| DE | 3116668 A1 | 1/1983 |
| DE | 3334007 A1 | 4/1985 |

(Continued)

OTHER PUBLICATIONS

Extended European Search Report and Opinion issued in connection with corresponding EP Application No. 17169323.7 dated Oct. 6, 2017.

*Primary Examiner* — Anh V La

(74) *Attorney, Agent, or Firm* — GE Aviation Systems LLC; William Andes

(57) ABSTRACT

A system for audibly communicating a status of at least one operably connected device or system, includes a status module configured to receive a signal representative of a status of the at least one operably connected device or system and a transceiver operably connected to the status module, wherein the transceiver is configured to receive signals from the status module and to transmit a sound.

17 Claims, 4 Drawing Sheets

(56) References Cited

U.S. PATENT DOCUMENTS

| | | |
|---|---|---|
| 7,383,106 B1 | 6/2008 | Coonse, Jr. |
| 7,482,951 B1 | 1/2009 | Brungart et al. |
| 7,511,213 B2 | 3/2009 | Childs, Jr. et al. |
| 8,174,376 B2 | 5/2012 | Kirmse et al. |
| 2008/0036624 A1* | 2/2008 | Ausman .................. G01D 7/00 340/945 |
| 2011/0087417 A1 | 4/2011 | Anderson et al. |
| 2011/0222698 A1 | 9/2011 | Asao et al. |
| 2013/0131897 A1 | 5/2013 | Simon |
| 2014/0111335 A1* | 4/2014 | Kleiss .................... G10K 15/00 340/540 |
| 2014/0330454 A1* | 11/2014 | Purpura ................. B64D 45/00 701/3 |
| 2015/0025762 A1 | 1/2015 | Wang |

FOREIGN PATENT DOCUMENTS

| | | |
|---|---|---|
| EP | 1800950 A2 | 6/2007 |
| EP | 2 669 706 A2 | 12/2013 |

* cited by examiner

SYSTEM AND METHOD FOR AUDIBLY COMMUNICATING A STATUS OF A CONNECTED DEVICE OR SYSTEM

BACKGROUND OF THE INVENTION

A user performing an operational task, such as flying an aircraft, primarily interacts with communicative systems that require visual attention or physical interaction. In some instances, visual attention or physical interaction can be undesirable if it suspends or removes the focus of the user from performing the operational task at hand. Audible alerts can be utilized in notifying the user of a state or status based on an audible signal without necessarily drawing the user's visual attention or physical interaction.

BRIEF DESCRIPTION OF THE INVENTION

In one aspect, the present disclosure relates to a system for audibly communicating a status of at least one operably connected device or system, including a status module configured to receive a signal representative of a status of the at least one operably connected device or system, the status having a set of states, and a transceiver operably connected to the status module, wherein the transceiver is configured to receive signals from the status module representative of one of the set of states of the at least one operably connected device or system and to transmit a musical sound representative of the set of states of the at least one operably connected device or system.

In another aspect, the present disclosure relates to a method for audibly indicating the status of an operably connected device or system includes monitoring a status condition of the operably connected device or system, transmitting an electronic signal representative of the status condition to a status module, determining, by the status module, the status condition of the operably connected device or system into a set of discrete states, and converting the set of discrete states into an audible signal representative of the set of discrete states.

In yet another aspect, the present disclosure relates to a system monitoring application includes a monitoring system operably connected to one or more associated systems or devices, wherein the monitoring system is configured to generate signals representative of a set of states for the one or more associated systems or devices, and a sound generating system operably interconnected to the monitoring system for receiving signals from the monitoring system representative of a status for the one or more associated systems or devices. The sound generating system includes a transmitter for transmitting sound representative of the set of states for the one or more associated systems or devices.

DESCRIPTION OF EMBODIMENTS OF THE INVENTION

Figure 1:
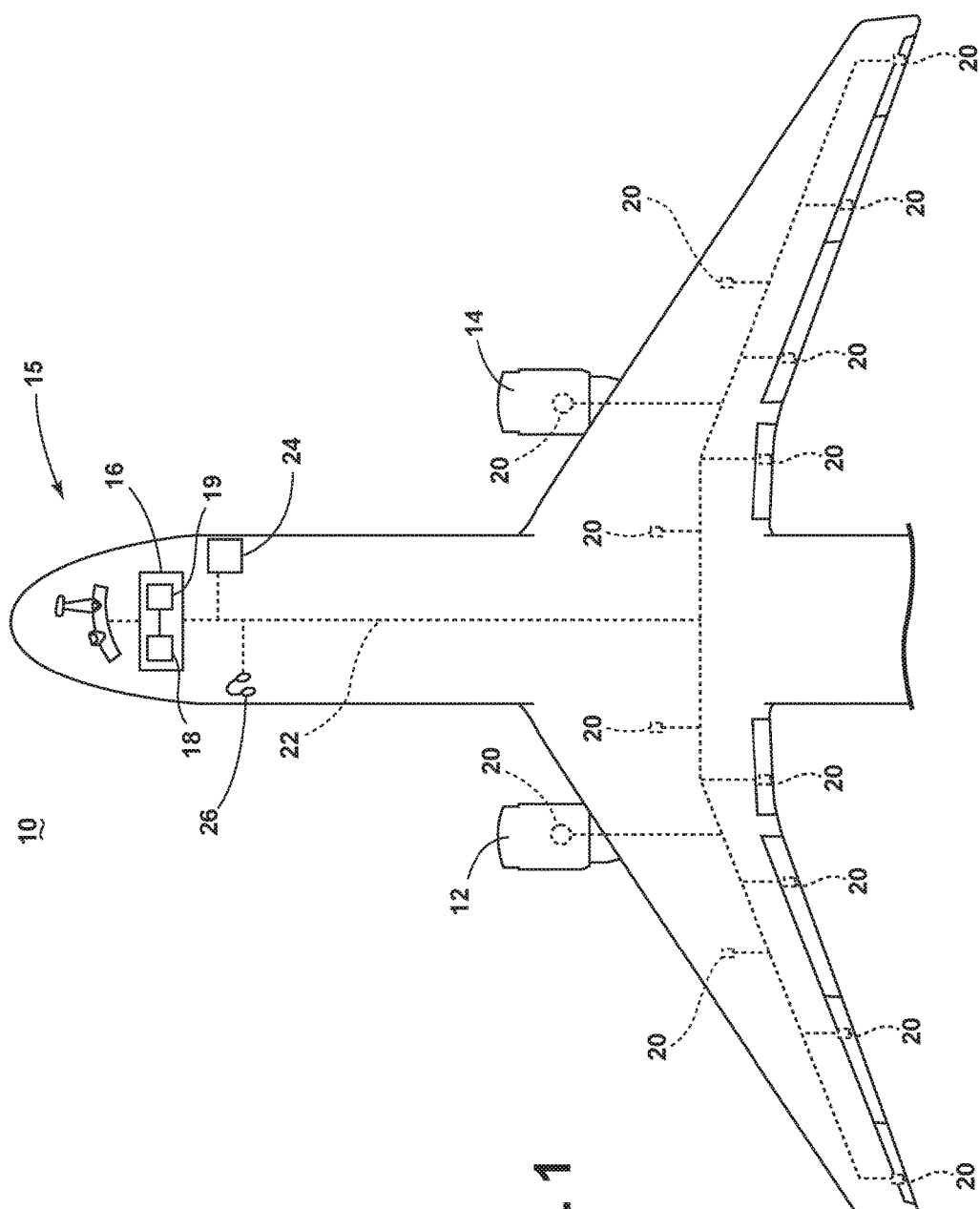
FIG. 1 is a top down schematic view of the aircraft having a set of systems and subsystems in accordance with the present disclosure.

Embodiments of the invention can be implemented in any environment, apparatus, or method for audibly alerting a user to the state or status of an operably connected device or system, wherein the audible alert can include a sound, harmony, or other audible representation of that state or status. While the illustrated embodiment of the disclosure is shown included in an aircraft, embodiments of the disclosure can be further included in a land, sea, or aircraft-based vehicles or any other aspect where monitoring of systems occurs including plant operations and health care.

As used herein, the terms "consonance" or "dissonance" refer to an audio, audible, musical form, or structural dichotomy that describes or defines a harmonic quality of a set of sounds. Consonance can be a measurement or determination of quality or quantity (e.g. determining when a consonance measurement or comparison is greater than or equal to a threshold consonance value) of a set of sounds to describe harmony, harmonic cooperation, or a unity or tonal fusion between at least two audible signals, such as musical notes, melody, or a musical composition. In contrast to consonance, dissonance can be a measurement or determination of quality or quantity of a set of audible sounds to describe disharmony, unstableness, or tension between at least two audible signals.

Taken together, the consonance and dissonance of a set of audible sounds can define a pleasantness or unpleasantness, or an acceptable or unacceptable perception of the set of audible sounds. In one non-limiting example, a consonance can be experienced by playing a musical note or a set of musical notes and the same musical note(s) one octave higher. Conversely, in one non-limiting example, a dissonance can be experienced by playing adjacent notes whose alterations cause them to be one semitone or half-step apart, such as B and C or C and D (sharp). Non-limiting embodiments of consonance or dissonance can further include the audible signal generation of successive sounds. For instance, the consonance or dissonance of simultaneous or successive audible signals can further depend on a previously generated or received audible signal. As additionally used herein, a "minor," "major," "lesser," or "greater" consonant or dissonant tone can include, or can be represented, in changes in volume or perceived difference in tone, relative to a standard value, standard tone, or to other audio signals.

Consonance and dissonance can include qualities of audible signals that are "perceivable" with regard to a user's hearing. It is understood that the perceivable qualities or "perceivability" can further vary between geographic regions or cultural understanding of music or musical compositions. However, the perceivable qualities can be considered binary in nature, and users can be trained or can learn to identify the consonance or dissonance between simultaneous audible signals. In this sense, a user can be trained or taught to reliably identify consonance or harmonic tones, or dissonance or dissonant tones, without regard to or deference to a user's personal "perception" of the set of audible signals. Stated another way, embodiments of the disclosure can be included wherein the audible signals reliably define a first consonance state and a second dissonance state, without concern that the first and second states are affected by the personal "perception" of the user, hearer, or listener.

As used herein, the terms "music", "musical composition", "musical sounds", and the like, can describe a newly created or existing set of notes played simultaneously or continuously, such that taken together, or taken as a whole, can represent musical melody or song. In one non-limiting example of the disclosure, the musical melody or song can be a perceivable or recognizable melody or song, such that the perceiver would recognize, or wherein the perceiver would recognize an alteration to, in the event of an inclusion of a dissonant tone or tones. In another non-limiting example of the disclosure, the melody or song can be selected or included from a set of musical melody or song styles or types, including but not limited to, classical music, popular music, country music, or the like.

Moreover, while "a set of" various elements have been described, it will be understood that "a set" can include any number of the respective elements, including only one element.

FIG. 1 is a schematic representation of an aircraft 10 having at least one gas turbine engine, shown as a left engine system 12 and a right engine system 14. The aircraft 10 can include a set of systems and subsystems configured for operating the aircraft 10. Non-limiting examples of systems and subsystems can include systems included in or carried by the aircraft 10 or the aircraft cockpit 15, such as a heads-up display 16 further including a motion detection system, such as an onboard radar system 18, and a health monitoring system 19. In one non-limiting embodiment, the radar system 18 can be configured for detecting motion of other aircraft in the vicinity of the aircraft 10. The aircraft 10 can further include a set of subsystems or data-generating components 20 schematically shown to be arranged throughout the aircraft 10. The set of data-generating components 20 can be communicatively coupled with a set of systems and subsystems by a common communications bus 22, such as a data bus.

As a non-limiting example, at least one system or subsystem 18, 19, 20 can require human monitoring during the operation of the aircraft 10. Non-limiting examples of human monitoring can include human interaction, human perception (visually or audibly), active human participation, or a general or specific awareness of the state or status of the at least one system or subsystem 18, 19, 20. While a radar system 18 has been illustrated, embodiments of a motion detection system can include, but are not limited to a system having a set of states based on detected motion. For example, the motion detection system can include a first state indicating a lack of motion detected by the motion detection system and a second state indicating motion is or has been detected by the motion detecting system. Additional states can be included.

The aircraft 10 or cockpit 15 can further include an audio communication system 24 and at least one audio receiving device, illustrated as a set of headphones or a headset 26. The audio communication system 24 and headset 26 are illustrated communicatively coupled with the common communications bus 22. Non-limiting alternative configurations can be included wherein, for instance, the headset 26 can be directly coupled with the audio communication system 24, or the heads up display 16, or wherein the audio communications system is a subcomponent of the heads up display 16.

The headset 26 can be configured to be worn by a member or user of the aircraft 10, including, but not limited to, a pilot, a co-pilot, or another user. The headset 26 can include an audio-producing device, such as a speaker or set of speakers. The headset 26 can also optionally include an audio input device configured to receive audio input from the member or user, such as a microphone. In this sense, the headset 26 can be configured to enable bi-directional communications (i.e. sending and receiving communications) between systems and subsystems of the aircraft 10 or between a set of members or users of the aircraft 10. The aircraft 10 or headset 26 can also be configured to enable communication between the aircraft and an external communication node, including but not limited to, ground-based communication nodes, traffic controller nodes, communication relay nodes, and the like. Thus, embodiments of the disclosure can be included wherein the headset 26 is configured to enable uni-directional or bi-directional audio communication originating or destined for on or off-aircraft communication nodes.

The aircraft 10 illustrated in FIG. 1 is merely one non-limiting schematic illustration of one example embodiment of the disclosure provided for understanding. Additional aircraft 10 and non-aircraft embodiments can be included. Additionally, the illustrated components can be alternatively placed, located, communicatively coupled, or the like. For example, while the radar system 18 and health monitoring system 19 are schematically illustrated as sub-components of the heads up display 16, embodiments of the disclosure can be included wherein the systems 18, 19 can be located or positioned elsewhere in the cockpit 15 or aircraft 10, and configured to present or provide a representation of the systems 18, 19 on the heads up display 16. Additionally, non-limiting embodiments of the aircraft 10 can include fewer or additional engine systems 12, 14, or alternative engine systems such as turbo-propeller engine systems.

Figure 2:
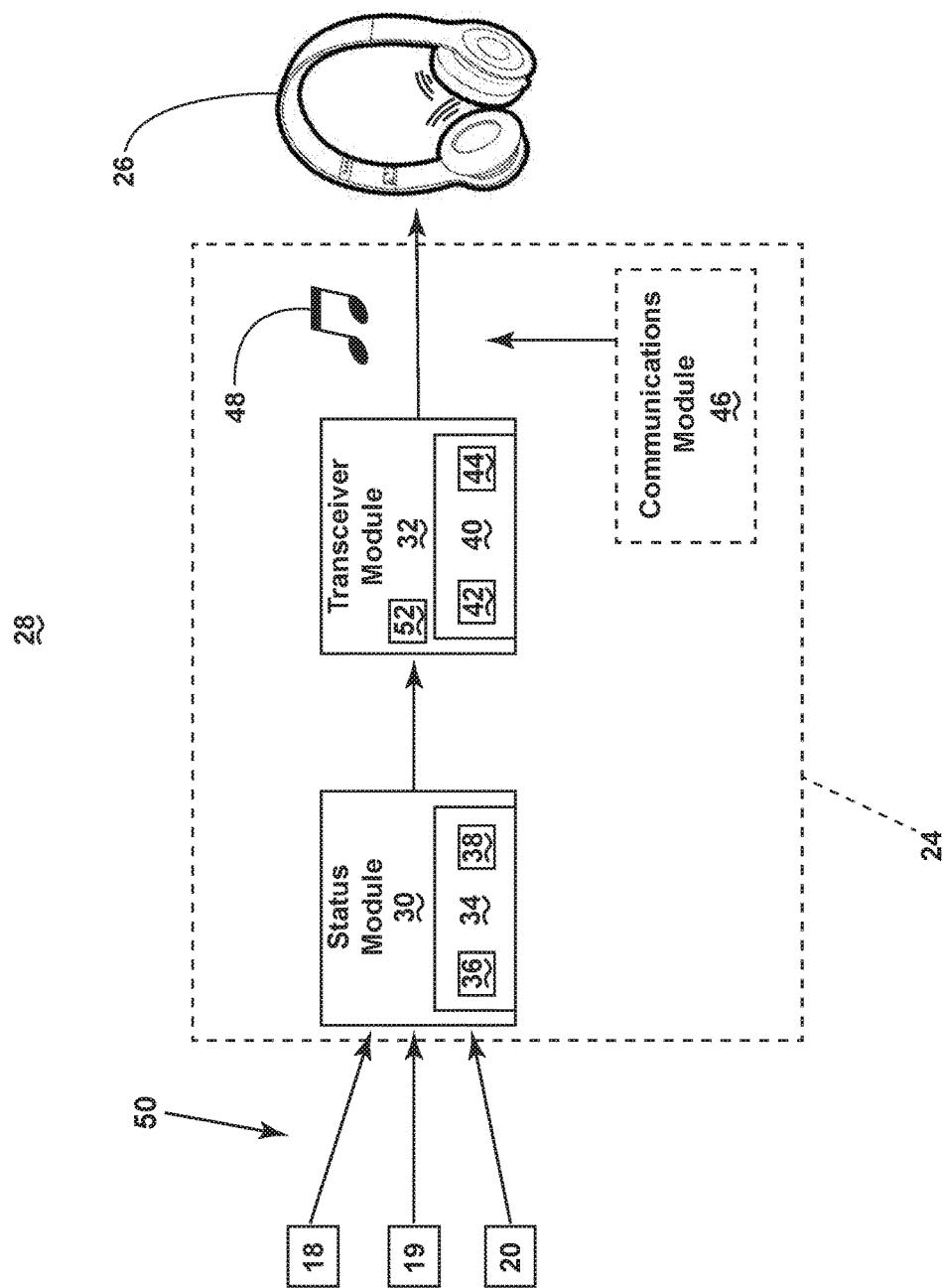
FIG. 2 illustrates an example schematic view notification system for the aircraft of FIG. 1, including an audio communications system, in accordance with various aspects described herein.

FIG. 2 illustrates a schematic view of a notification system 28 for audibly communicating a status of at least one operably connected device, system, or subsystem. As shown, the set of systems and subsystems 18, 19, 20 configured for operating the aircraft 10 can provide a set of respective signals to the audio communications system 24. The audio communications system 24 can include a status module 30 and a transceiver module 32. As shown, the status module 30 can include a first controller module 34 having a first processor 36 and a first memory 38. The transceiver module 32 can also include a second controller module 40 having a second processor 42 and a second memory 44. The transceiver module 32 can optionally include a volume modification module 52. The transceiver module 32 can be communicatively coupled with the status module 30.

The first memory 38 can include random access memory (RAM), read-only memory (ROM), flash memory, or one or more different types of portable electronic memory, such as discs, DVDs, CD-ROMs, etc., or any suitable combination of these types of memory. The first controller module 34 or the first processor 36 can be operably coupled with the first memory 38 such that one of the first controller module 34 or the first memory 38 can include all or a portion of a computer program having an executable instruction set for controlling the operation of the status module 30, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, a first controller module 34, first processor 36, or special purpose processing machine to perform a certain function or group of functions. In implementation, the functions can be converted to a computer program comprising a set of executable instructions, which can be executed by the first processor 36.

Similarly, the second memory 44 can include random access memory (RAM), read-only memory (ROM), flash memory, or one or more different types of portable electronic memory, such as discs, DVDs, CD-ROMs, etc., or any suitable combination of these types of memory. The second controller module 40 or the second processor 42 can be operably coupled with the second memory 44 such that one of the second controller module 40 or the second memory 44 can include all or a portion of a computer program having an executable instruction set for controlling the operation of the transceiver module 32, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, a second controller module 40, second processor 42, or special purpose processing machine to perform a certain function or group of functions. In implementation, the functions can be converted to a computer program including a set of executable instructions, which can be executed by the second processor 42.

The status module 30 or the first controller module 34 can be configured or enabled to receive a set of respective signals 50 provided to the audio communications system 24 from the set of systems and subsystems 18, 19, 20. The set of respective signals 50 can include analog signals, digital signals, or a combination thereof. The set of respective signals 50 can be indicative of or representative of a status or state of the respective system or subsystem 18, 19, 20 communicatively coupled with the audio communications system 24. In one non-limiting embodiment of the disclosure, the set of representative signals 50 can include a status of the respective system or subsystem 18, 19, 20, wherein the status includes a set of states of the respective system or subsystem 18, 19, 20. The status module 30 or the first controller module 34 can be configured to receive the set of representative signals 50 and operably determine, compute, process, or interpret the set of representative signals 50.

The status module 30 can be further configured or enabled to determine, compute, process, or interpret analog or digital signals from a single system or subsystem 18, 19, 20, and generate a set of statuses or states for the single system. For example, the status module 30 can receive an analog or digital signal from the radar system 18, and determine a status or state representative of individual radar contacts. In this sense, the status module 30 can further be configured to determine, compute, process, or interpret a set of analog or digital signals for the single system or subsystem 18, 19, 20. Alternatively, at least a portion of the determining, computing, processing, interpreting, or generating of the set of statuses or states can be enabled or accomplished by the respective system or subsystem 18, 19, 20, and provided to the status module 30. In this non-limiting example, the radar system 18 can be enabled to determine, compute, process, or interpret a set of radar contacts, and associate or determine a status or state for the radar contact(s). The set of statuses or states can then be communicated or provided to the status module 30.

The status module 30 can be configured to accumulate, summate, or otherwise gather the set of statuses or states, and generate, produce, or provide at least a subset of the set of statuses or states to the transceiver module 32. In one non-limiting embodiment of the disclosure, the status module 30 can be configured to summate or "roll up" a set of statuses or states from a single system or subsystem 18, 19, 20 into a single status, state, or a set of statuses or states less than the set of received representative signals 50.

In one non-limiting example, the radar system 18 can provide a set of representative signals corresponding to a set of radar signatures. The status module 30 can be configured to determine a collective radar system status or state, or a set of radar statuses or states, based on the set of representative signals, and provide only collective radar system status or state to the transceiver module 32. For instance, if a single radar signature in a set of radar signals is indicative of an impending encroachment or violation of airspace thresholds, a collective radar system status or state representative of the impending encroachment or violation of airspace thresholds can be provided to the transceiver module 32.

Non-limiting embodiments of the set of states or statuses of the systems or subsystems 18, 19, 20 can include a first state indicating an acceptable operational state or status of the respective system or subsystem 18, 19, 20 and a second state indicating an unacceptable operational state or status of the same. The first state or the second state can further include varying levels, degrees, states, or statuses of acceptable or unacceptable operation, respectively. For example, the second state of unacceptable operation can further include a set of varying unacceptable operation limits or levels, with increasing representation of unacceptable operation.

In the above-described non-limiting example of the radar system 18, while encroachment or violation of airspace thresholds or an impeding collision determination can be classified or categorized as "unacceptable" by the radar system 18 or the status module 30, the impending collision determination can be "more" unacceptable than the violation of airspace thresholds. As used herein, "more" or "less" acceptable or unacceptable operations can be determined based on various priorities, thresholds, urgency, criticality, danger, severity, or the like. Furthermore, "more" or "less" acceptable or unacceptable operations can be determined with respect to other system or subsystems 18, 19, 20. For example, a state or status indicative of an engine 12, 14 failure from the health monitoring system 19 can be "more" unacceptable than a violation of airspace threshold state or status from the radar system 18 due to the respective criticality of the states or states.

The transceiver module 32 or the second controller module 40 can be configured or enabled to receive the set of states or statuses provided by the status module 30. The transceiver module 32 or the second controller module 40 can be further configured or enabled to generate, produce, or otherwise transmit an audio signal 48 based on the set of states or statuses received, and provide the audio signal 48 to the headset 26. In this sense, the audio communication system 24, the status module 30, the transceiver module 32, the audio receiving device, or a combination thereof, can define a sound generating system operably interconnected with a the set of systems or subsystems 18, 19, 20. Additionally, the optional volume modification module 52 can be configured to selectively modify a resulting volume of the audio signal 48, or a selective portion thereof.

The headset 26 can further produce the audio signal 48 by way of the speaker, for example. The audio communications system 24 can optionally include a communications module 46 configured to enable additional audible signals to be produced by the headset 26. Non-limiting examples of the additional audible signals can include, but are not limited to, verbal communication, ground-based communications, air traffic controller communications, alerts, messages, indicators, or other typical audible signals not generated, produced, or otherwise transmitted by the transceiver module 32. While the audio signal 48 is represented by a musical note symbol, the audio signal 48 can include a set of musical notes, a musical composition, or non-musical communications or indications, as described herein. In another non-limiting embodiment of the disclosure, the audio signal 48 can represent a set or series of audio signals 48, including a set of musical instruments.

The transmitted audio signal 48 can include a set of audio, audible sounds, or the like having consonance, dissonance, or a combination of consonance and dissonance. The consonance or dissonance can further be based on the set of states or statuses received by the status module 30. In one non-limiting example, when a set of statuses or states indicates or are representative of the first state (e.g. acceptable operations), the transceiver module 32 can generate or produce an audio signal 48 having a harmonic tone without no perceptible dissonance. In another non-limiting example, when at least one status or state indicates or is representative of the second state (e.g. unacceptable operations), the transceiver module 32 can generate or produce an audio signal 48 having a dissonant tone, or having a harmonic tone and a dissonant tone.

Non-limiting embodiments of the disclosure can be included wherein the transceiver module 32 is configured to generate or produce a series or set of audio signals 48 representative of a set or subset of the status, state, or set of states or states of the operably connected systems or subsystems 18, 19, 20. Non-limiting embodiments of the disclosure can be further included wherein the operably connected systems or subsystems 18, 19, 20 can be individually or uniquely represented by the transceiver module 32 such that the transceiver module includes a unique audio signal 48 for a respective system or subsystem 18, 19, 20. In on non-limiting example, the respective system or subsystem 18, 19, 20 can be uniquely represented by a unique musical instrument. In this sense, the set of systems or subsystems 18, 19, 20 can have a unique audio signal 48, tone, harmonic, consonance, or dissonance. The unique audio signals 48 can further be perceivably differentiated from one another such that a user or perceiver can be trained, for example, to identify or distinguish individual audio signals 48 or individual system or subsystem 18, 19, 20 representations from the set of unique audio signals 48. In one non-limiting example, a user or perceiver can audibly identify the operation status, operational state, or generally perceive the "acceptability" or "unacceptability" of one system (e.g. the radar system 18) compared to another system (e.g. the health monitoring system 19) based on the unique audio signal 48 representative of the respective systems or subsystems 18, 19, 20. When systems and subsystems 18, 19, 20 are reporting acceptable operation, the audio signal 48 can represent a complete harmonic or consonance state.

Figure 3:
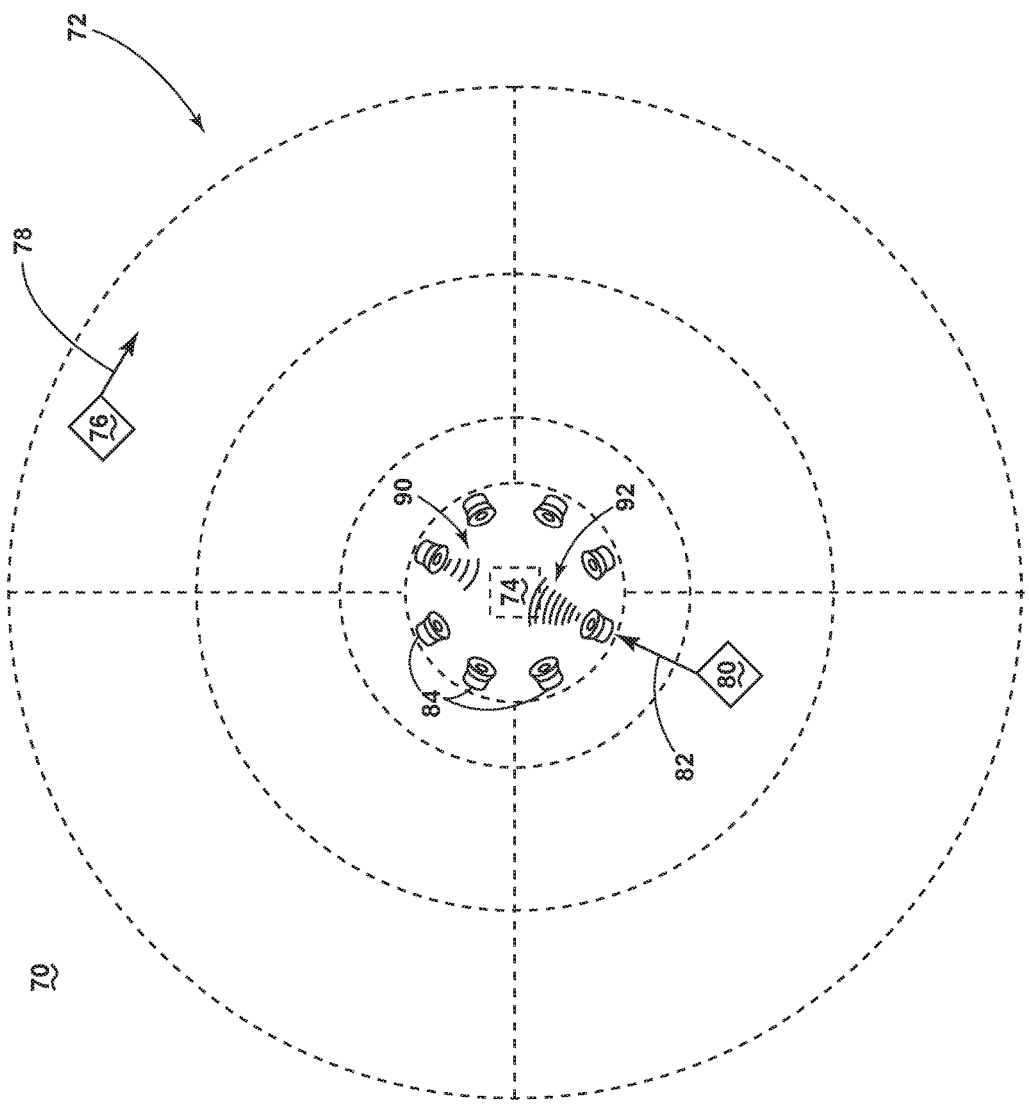
FIG. 3 is a schematic representation of a radar system and operation of the audio communications system of FIG. 2 in accordance with various aspects described herein.

FIG. 3 illustrates one non-limiting schematic embodiment of the operation of the audio communication system 24 or the notification system 28. As shown, a schematic representation of a radar system 70 includes a detection area 72 including a perception reference point 74 representing a user or the aircraft 10. The detection area 72 is shown including a first radar contact 76 having a first direction or vector of motion 78, and a second radar contact 80 having a second direction or vector of motion 82. In this illustrated example, the perception reference point 74 can be fixed (e.g. stationary relative to the first or second radar contacts 76, 80) or can be in motion (e.g. can include a third direction or vector of motion relative to the first or second radar contacts 76, 80). The first vector of motion 78 is directed away from the perception reference point 74 and thus indicates the first radar contact 76 is not likely to collide with the perception reference point 74. Conversely, the second vector of motion 82 is directed toward the perception reference point 74, and thus indicates the second radar contact 80 might collide with the perception reference point 74.

The perception reference point 74 is further schematically encircled by a set of audio receiving devices, such as a set of speakers 84. The set of speakers 84 can schematically represent non-limiting embodiments of the headset 26 having more than left and right ear speakers and enabling positionally respective sound (i.e. surrounding sound or three-dimensional sound relative to the perception reference point 74). In another non-limiting embodiment, the set of speakers 84 can represent a headset 26 enabled to generate or create a virtual positionally respective sound, for instance, via executable program. The positionally respective sound configuration of the set of speakers 84 or the headset 26 can be utilized to indicate or represent the relative location of the radar contacts 76, 80 relative to the perception reference point 74. Additional non-limiting embodiments can include fewer speakers 84, including, but not limited to one speaker (mono audio) or two speaker (stereo audio) configurations.

As shown, the first radar contact 76 can be detected by the radar system 18, which provides a state or status of the first contact to the audio communication system 24 or the status module 30. The status module 30 can receive the first contact state or status, and provide a state or status to the transceiver module 32. The transceiver module 32, in turn, can generate, produce, or otherwise transmit a first audio signal 90 to the set of speakers 84, based on the state or status from the status module 30. The first audio signal 90 can be used to spatially represent the relative location of the first radar contact 76 or the first vector of motion 78, relative to the perception reference point 74. Similarly, the audio communications system 24 can generate a second audio signal 92 based on the second radar contact 80 or the second vector of motion, relative to the perception reference point 74.

At least one of the first or the second audio signals 90, 92 can represent a dissonant tone, as described above. Embodiments of the disclosure can be further included wherein a collective or discrete number of consonant or dissonant tones correspond to a number of objects detected by the radar system 18, 70. Stated another way, a user can perceive consonance or dissonance, or a consonant or dissonant tone, for the radar contact(s) 76, 80, a set or subset of the states of a system or subsystem 18, 19, 20, a set or subset of the status of a system or subsystem 18, 19, 20, or a combination thereof. Additionally, non-limiting embodiments of the disclosure can be included wherein the relative consonance or dissonance, or the relative consonant or dissonant tone can be varied to represent varying levels of "acceptability" or "unacceptability" of one system, one state, or one status compared to another system, state.

For instance, since the first vector of motion 78 indicates the first radar contact 76 is not likely to collide with the perception reference point 74, the first audio signal 90 can be represented as a minor or lesser dissonant tone. The minor or lesser dissonant tone can be utilized to draw attention to, to announce the perception of, or to notify the user or the perception reference point 74 of the presence of, or state, status, or the like, of the first radar contact. In another instance, since the second vector of motion 82 indicates the second radar contact 80 might collide with the perception reference point, the second audio signal 92 can be represented as a major or greater dissonant tone. The major or greater dissonant tone can be utilized to draw greater or more attention to the urgency or relative priority of the possible collision, compared with the minor indication of another (non-colliding) first radar contact 76. As illustrated, the second audio signal 92 is "greater," "louder," or "more" perceivable for the perception reference point 74, as indicated by the additional sound waves, compared with the first audio signal 90. In another non-limiting embodiment of the disclosure, a "greater" or "louder" perception can be utilized to represent a shorter distance from the perception reference point 74, compared with a larger distance being "quieter" or "softer."

Additional embodiments of the disclosure can include changing the modulation, amplitude, frequency, consonance, or dissonance of the audio signal 48 based on qualities including, but not limited to, identification or inability to identify a radar contact(s), relative movement of the radar contact(s), alterations to the vector(s) of motion of the radar contact(s), and the like.

Figure 4:
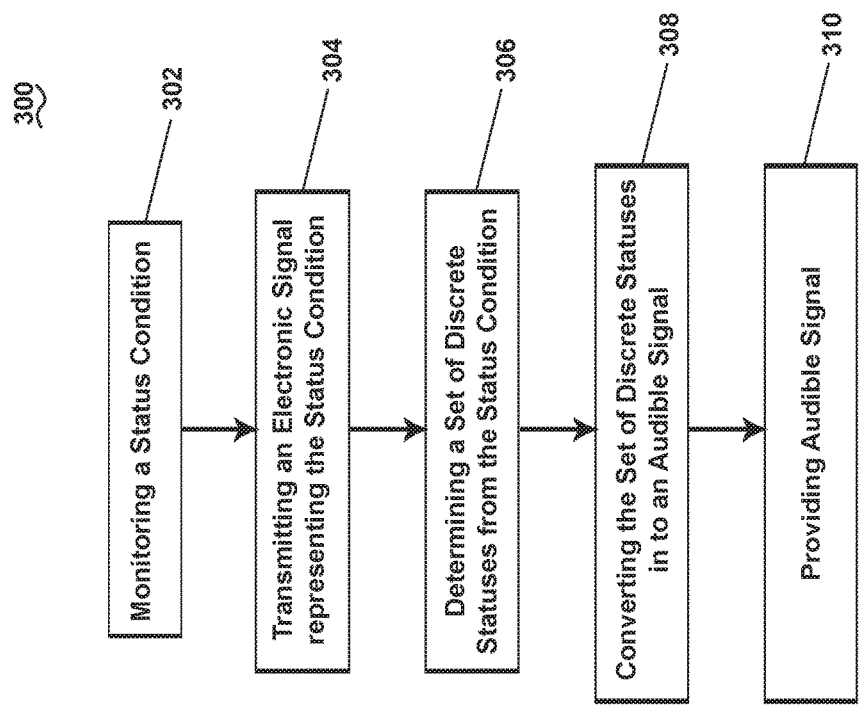
FIG. 4 is an example a flow chart diagram, demonstrating a method for audibly indicating the status of an operably connected device, system, or subsystem, in accordance with various aspects described herein.

FIG. 4 illustrates a flow chart demonstrating a method 300 for audibly indicating the status of an operably connected device, system, or subsystem 18, 19, 20. The method 300 begins by monitoring a status condition of the operably connected device, system, or subsystem 18, 19, 20 at 302. Next, the method 300 includes transmitting an electronic signal 50 representative of the status condition to the audio communication system 24 or the status module 30 at 304. The method 300 then includes determining, by the status module 30, the status condition of the operably connected device, system, or subsystem 18, 19, 20 into a set of discrete states at 306. In one non-limiting embodiment of the disclosure, the determining step at 306 can further include building a data structure representative of the set of discrete states and an amplitude indicator for the set of discrete states. Non-limiting embodiments of the amplitude indicator can be representative of or related to the perceivability, consonance, dissonance, volume, pitch, or the like, for the resulting audio signal 48. In this sense, the amplitude indicator can include a positive, negative, or zero value to indicate whether the set of discrete states is a (respectively) positive, negative, or neutral state. Non-limiting embodiments of the disclosure can be included wherein the volume modification module is configured to adjust the amplitude indicator, as described above.

The determined set of discrete states can then be converted, for example by the transceiver module 32, into an audio signal 48 representative of the set of discrete states at 308. In non-limiting instances where amplitude indicators are included, the converting step at 308 can include introducing a harmonic or consonant tone for the set of states with a positive or zero amplitude indicator. In another non-limiting instance where amplitude indicators are included, the converting step at 308 can include introducing a dissonant tone for the set of states with a negative indicator. Finally, the method 300 can optionally include providing the audio signal 48 to the audio receiving device, such as the headset 26 or set of speakers 84.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method.

Many other possible embodiments and configurations in addition to that shown in the above figures are contemplated by the present disclosure. For example, while the radar system 18, and operation of the audio communication system 24 with respect to the radar system 18 is described in detail, embodiments of the disclosure are applicable for the other system and subsystems 18, 19, 20 described. For example, the health monitoring system 19 can provide dissonant tones representative of various health monitoring status of varying importance. In another non-limiting example configuration, when an operating state or status, as expressed from any data point, exceeds a threshold of acceptability, a resulting sound pattern (for example, called "beats") will have a frequency that is the difference between the two frequencies being compared. Hence, corrective action can be taken, implemented, or instituted, until the "beats" disappear or the threshold of acceptability is reached.

The embodiments disclosed herein provide a system and method for audibly communicating a status of a connected device or system. Non-limiting embodiments of the disclosure can generate, incorporate, layer, or include continuous or discrete tones, sounds, or audio signals for a user or perceiver of the audio signals. Thus, the user or perceiver of the audio signal can be provided additional cues, indicators, notifications, or the like, by way of the consonance or dissonance of the audio signals, allowing for a greater situational awareness, state, or status of the various systems or subsystems. In this manner, by changing the frequency, tone, and amplitude or multiplexing additional tones into the sound scape a user can be provided with auditory versions of the information available to them through their cockpit display systems.

In some non-limiting embodiments of the disclosure, the state or status of the various systems or subsystems can be duplicated through additional communicative systems, such as displays or devices in the cockpit, in the example of an aircraft. Embodiments of the above-described disclosure enable a pilot, crew, or user to attain a preliminary status or state of the systems or subsystems without having to engage or interact with the additional communicative systems. In another non-limiting embodiment of the disclosure, the audio signals can provide indication to a user to engage the additional communicative systems upon indication or notification of a dissonant tone, representative of some system or subsystem interaction.

The technical effect is that the above described embodiments enable the perceivable audible signaling of a variety of states or statuses of the connected devices or systems. One advantage that can be realized in the above embodiments is that the above described embodiments allows for increased situational awareness for a user or perceiver without requiring additional visual attention. In this situation, the user or perceiver can provide additional focus on a primary function, such as flying, while a secondary perception of hearing can be used to provide additional notification of operating states or statuses. Thus, embodiments of the disclosure can provide awareness to a secondary perception (hearing) such that the awareness does not impede or overwhelm other perceptions or sensing of a user, including but not limited to sight (visual attention) or touch (physical resources, hands, etc.).

Another advantage of the above-described embodiments is that the simplified indication or notification of acceptability or unacceptability allows for an intuitive indication of the operating state or status of the systems or subsystems. When an unacceptable indication is provided, a perceiver can further reference additional communicative systems for details, or can identify a particular unacceptability by way of audible recognition of the unique audio signal, as described herein.

Yet another advantage of the above-described embodiments is that audible representation of status indications has been shown to reduce fatigue by the user or perceiver in operational tasks, for example, piloting aircraft. The consonance and dissonance, or the changing set of tones of the audio signal allow the brain to no longer focus on a single piece of information that rarely changes, such as a flight display or other additional communicative systems. This in turn allows the user or perceiver to focus for a longer period on the operational task, such as longer flights, and reduce the chances of missing notifications or alerts to events, states, or statuses.

Yet another advantage of the above-described embodiments is that the system allows for better multiplexing of multiple audio signals, and can further utilize three-dimensional sound for situational awareness. The three-dimensional sound allows for an intuitive interaction with spatially relevant factors, such as radar systems.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for audibly communicating a status of at least one operably connected device or system, comprising:
    a status module configured to receive a signal representative of a status of the at least one operably connected device or system, the status having a set of states, wherein the at least one operably connected device or system includes an onboard radar system configured for detecting motion of other aircraft in the vicinity of the aircraft, and the set of states of the motion detection system includes a first state indicating a lack of motion detected by the motion detection system and a second state indicating motion detected by the motion detection system; and
    a transceiver operably connected to the status module, wherein the transceiver is configured to receive signals from the status module representative of one of the set of states and to transmit a musical sound representative of the set of states of the at least one operably connected device or system;
    wherein indications of the second state are prioritized based on criticality before transmitting the representative musical sound.

2. The system of claim 1 wherein the transceiver is further configured to transmit a set of simultaneous musical sounds representative of the set of states of the at least one operably connected device or system.

3. The system of claim 1 wherein the transceiver is further configured to transmit a continuous set of musical sounds representative of the continuous set of states of the at least one operably connected device or system.

4. The system of claim 1 wherein the musical sound representative of the first state includes a harmonic tone with no perceptible dissonance or the musical sound representative of the second state includes a unique dissonant tone.

5. The system of claim 1 wherein the at least one operably connected device or system includes a system including at least one subsystem which requires human monitoring of the state of the system or at least one subsystem.

6. The system of claim 1, further comprising at least one headset operably interconnected to the status module or the transceiver for receiving signals representative of the status of the at least one operably connected device or system.

7. The system of claim 1 wherein the musical sound representative of the second state includes a discrete number of tones corresponding to a number of objects detected by the motion detection system.

8. A method for audibly indicating the status of an operably connected device or system comprising the steps of:
    monitoring a status condition of the operably connected device or system, wherein the operably connected device or system includes an onboard radar system configured for detecting motion of other aircraft in the vicinity of an aircraft;
    transmitting an electronic signal representative of the status condition to a status module;
    determining, by the status module, the status condition of the operably connected device or system into a set of discrete states, wherein the set of discrete states include at least one of a first state indicating a lack of motion detected by the motion detection system or a second state indicating motion detected by the motion detection system;
    prioritizing, indications of the second state, based on criticality; and
    converting the set of discrete states into an audible signal representative of the set of discrete states.

9. The method of claim 8 wherein the converting includes converting the set of discrete states into a continuous set of musical sounds representative of the continuous set of discrete states.

10. The method of claim 9 wherein the determining step further includes the step of building a data structure representative of the set of discrete states and an amplitude indicator for the set of discrete states.

11. The method of claim 10 wherein the amplitude indicator can include a positive, zero, or a negative value to indicate whether the set of discrete states is a positive, neutral or negative state.

12. The method of claim 11 wherein the step of converting the set of discrete states into an audible signal representative of the set of discrete states includes introducing a harmonic tone for the set of states with a positive or zero amplitude indicator, and a dissonant tone for the set of states with a negative indicator.

13. The method of claim 12 wherein the introducing step further includes changing the volume of either the harmonic or dissonant tone in a relationship to the amplitude indicator for the set of states.

14. A system monitoring application, comprising:
a monitoring system operably connected to an onboard radar system that detects motion of other aircraft in the vicinity of an aircraft, and generates signals representative of a set of states of a status for the radar system, the set of states including a first state indicating a lack of motion detected by the motion detection system or a second state indicating motion detected by the motion detection system;
a sound generating system operably interconnected to the monitoring system that receives signals from the monitoring system representative of the status for the radar system; and prioritizes, indications of the second state, based on criticality; and,
a transmitter, included in the sound generating system, that transmits sound representative of the set of states.

15. The system of claim 14 wherein the sound generating system is further configured to generate a continuous set of musical sounds representative of the continuous set of states, and wherein the transmitter is configured to transmit the continuous set of musical sounds.

16. The system monitoring application of claim 14 wherein the sound transmitted by the sound generating system includes a volume modification module that changes the volume of sound corresponding to the set of states of the radar system.

17. The system monitoring application of claim 14 wherein the sound generated by the sound generation system includes a harmonic tone for a positive or acceptable state, and a unique dissonant tone for a negative or unacceptable state.

* * * * *